(12) United States Patent
Spangler et al.

(10) Patent No.: US 12,281,595 B1
(45) Date of Patent: Apr. 22, 2025

(54) TURBINE BLADE WITH BOOMERANG SHAPED WALL COOLING PASSAGES

(71) Applicant: RTX CORPORATION, Farmington, CT (US)

(72) Inventors: Brandon W. Spangler, Vernon, CT (US); David R. Pack, Gold Canyon, AZ (US); Jaime G. Ghigliotty Rosado, Cabo Rojo, PR (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/486,788

(22) Filed: Oct. 13, 2023

(51) Int. Cl.
*F01D 5/18* (2006.01)

(52) U.S. Cl.
CPC ........ *F01D 5/187* (2013.01); *F05D 2240/305* (2013.01); *F05D 2240/306* (2013.01); *F05D 2260/202* (2013.01); *F05D 2260/22141* (2013.01)

(58) Field of Classification Search
CPC ............... F01D 5/187; F05D 2240/305; F05D 2240/306; F05D 2260/202; F05D 2260/22141
See application file for complete search history.

(56) References Cited

U.S. PATENT DOCUMENTS

| | | | |
|---|---|---|---|
| 5,562,409 A | 10/1996 | Livsey et al. | |
| 8,366,395 B1* | 2/2013 | Liang | F01D 5/187 416/97 R |
| 8,398,370 B1* | 3/2013 | Liang | F01D 5/187 416/97 R |
| 8,523,523 B2* | 9/2013 | Townes | F01D 5/187 416/97 R |
| 9,605,544 B2* | 3/2017 | Tibbott | F01D 5/186 |
| 9,765,642 B2* | 9/2017 | Smith | F01D 5/187 |
| 9,879,547 B2 | 1/2018 | Potter et al. | |
| 9,995,149 B2 | 6/2018 | Foster et al. | |
| 11,199,098 B2* | 12/2021 | Leary | F01D 9/041 |
| 2007/0059172 A1 | 3/2007 | Lee et al. | |
| 2015/0110611 A1* | 4/2015 | Bergholz | F01D 25/12 415/178 |
| 2018/0010465 A1* | 1/2018 | Xu | F23R 3/06 |
| 2021/0222568 A1 | 7/2021 | Snider | |

FOREIGN PATENT DOCUMENTS

| | | |
|---|---|---|
| EP | 3199762 A1 | 8/2017 |
| EP | 3269930 A1 | 1/2018 |

OTHER PUBLICATIONS

European Search Report for EP Application No. 24206396.4 dated Feb. 13, 2025.

* cited by examiner

*Primary Examiner* — Topaz L. Elliott
*Assistant Examiner* — Andrew J Marien
(74) *Attorney, Agent, or Firm* — Carlson, Gaskey & Olds, P.C.

(57) ABSTRACT

A turbine component includes a body having a pair of spaced walls, with at least one of the walls for facing a fluid flow when mounted in a gas turbine engine. There are a plurality of wall cooling passages having a generally boomerang shape such that a peak apex is spaced from the wall and an indent apex is adjacent to the wall, with the plurality of wall cooling passages having interior sides extending from the peak apex toward the wall to define a corner. Outer sides extend from the corners with a component away from the wall and to the indent apex. A gas turbine engine is also disclosed.

18 Claims, 5 Drawing Sheets

TURBINE BLADE WITH BOOMERANG SHAPED WALL COOLING PASSAGES

BACKGROUND OF THE INVENTION

This application relates to the shape of wall cooling passages in a gas turbine engine turbine blade.

Gas turbine engines are known, and typically include a fan delivering air into a bypass duct as propulsion air. The fan also delivers air into a core engine where it moves into a compressor section. The air is compressed and delivered into a combustor where it is mixed with fuel and ignited. Products of this combustion pass downstream over turbine rotors, driving them to rotate. The turbine rotors in turn rotate the fan and compressor rotors.

It is known that components in the turbine section see very high temperatures. Thus, cooling air is supplied into internal cavities. In turbine blades there are a number of competing factors that impact the design of the internal cooling passages. The passages must withstand stress and strain in an axial direction caused by thermal loads. Moreover, there is mechanical stress caused by centrifugal loads. In addition, the size of the internal cooling passages must be sufficient to provide adequate cooling, but not compromise strength.

SUMMARY OF THE INVENTION

In a featured embodiment, a turbine component includes a body having a pair of spaced walls, with at least one of the walls for facing a fluid flow when mounted in a gas turbine engine. There are a plurality of wall cooling passages having a generally boomerang shape such that a peak apex is spaced from the wall and an indent apex is adjacent to the wall, with the plurality of wall cooling passages having interior sides extending from the peak apex toward the wall to define a corner. Outer sides extend from the corners with a component away from the wall and to the indent apex.

In another embodiment according to the previous embodiment, the component has an airfoil extending from a leading edge to a trailing edge and the walls including a pressure side wall connecting the leading edge to the trailing edge and a suction side wall also connecting the leading edge to the trailing edge. Internal cooling passages in the airfoil are between the leading edge, the suction side, the trailing edge, and the pressure side. The cooling passages include central cooling passages, and the wall cooling passages include pressure side wall cooling passages, and suction side wall cooling passages. At least one of the pressure side wall cooling passages has the general boomerang shape such that the peak apex is spaced from the pressure side wall and the indent apex adjacent to the pressure side wall, with the pressure side wall cooling passages having the interior sides extending from the peak apex toward the pressure side wall to the corner and the corner being a pressure side corner. The outer sides extend from the pressure side corners with a component away from the pressure side wall to the indent apex. At least one of the suction side cooling passages has the general boomerang shape such that the peak apex is spaced from the suction side wall and the indent apex is adjacent to the suction side wall, with the suction side wall cooling passages having the interior sides extending from the peak apex toward the suction side wall to the corner and the corner being a suction side corner. The outer sides extend from the suction side corners with a component away the suction side to the indent apex.

In another embodiment according to any of the previous embodiments, at least some of the pressure side wall cooling passages and at least one of the suction side wall cooling passages having a film cooling hole extending from at least one of the pressure side into the pressure side wall cooling passages or from the suction side into the suction side wall cooling passages.

In another embodiment according to any of the previous embodiments, at least some of the film cooling hole on the pressure side extend from the pressure side wall into the pressure side wall cooling passages at the indent apex, and at least some of the film cooling holes on the suction side extend into the suction side wall cooling passages at the indent apex.

In another embodiment according to any of the previous embodiments, there are a plurality of the pressure side and suction side wall cooling passages having the generally boomerang shape.

In another embodiment according to any of the previous embodiments, at least some of the plurality of pressure wall cooling passages are connected to each other by a connecting passage, and at least some of the plurality of suction side wall cooling passages are connected to each other through connecting passages.

In another embodiment according to any of the previous embodiments, the film cooling holes associated with each of the wall cooling passages on the pressure side and the suction side have a first meter portion communicating to the pressure side wall cooling passages and the suction side wall cooling passages and an enlarged diffused portion connecting the first meter portion to an outer surface of the respective one of this pressure side and suction side.

In another embodiment according to any of the previous embodiments, a center height is defined between the indent apex and the peak apex, and an edge distance is defined between the interior side connecting the peak apex to the corner. The outer side connects the corner to the indent apex at fillet tangencies connecting the curved portion defining the corner to each of the side portions, and a ratio of the center height to the edge distance is greater than or equal to 1.1 and less than or equal to 2.5.

In another embodiment according to any of the previous embodiments, a width is defined between the corners of the at least one of the wall cooling passages, a peak height is defined between the peak apex and a line connecting two points at each side of each of the wall cooling passages that are closest to the associated wall, and a ratio of the peak height to the width is greater than or equal to 0.3 and less than or equal to 1.0.

In another embodiment according to any of the previous embodiments, an indent height is defined between the line and the indent apex and a ratio of the indent height to the width is greater than or equal to 0.05 and less than or equal to 0.3.

In another featured embodiment, a gas turbine engine includes a compressor section, a combustor section, and a turbine section. The combustor section and the turbine section have components, and at least one of the components having a body having a pair of spaced walls, with at least one of the walls for facing a fluid flow when mounted in a gas turbine engine. There are a plurality of wall cooling passages having a generally boomerang shape such that a peak apex is spaced from the wall and an indent apex is adjacent to the wall, with the plurality of wall cooling passages having interior sides extending from the peak apex toward the wall to define a corner. Outer sides extend from the corners with a component away from the wall and to the indent apex.

In another embodiment according to any of the previous embodiments, the component has an airfoil extending from a leading edge to a trailing edge and the wall including a pressure side wall connecting the leading edge to the trailing edge and a suction side wall also connecting the leading edge to the trailing edge. Internal cooling passages in the airfoil between the leading edge, the suction side, the trailing edge, and the pressure side, the cooling passages include central cooling passages, and the wall cooling passages including pressure side wall cooling passages, and suction side wall cooling passages. At least one of the pressure side wall cooling passages have the general boomerang shape such that the peak apex is spaced from the pressure side wall and the indent apex is adjacent to the pressure side wall, with the pressure side wall cooling passages having the interior sides extending from the peak apex toward the pressure side wall to the corner. The corner is a pressure side corner, and the outer sides extend from the pressure side corners with a component away from the pressure side wall to the indent apex. At least one of the suction side cooling passages have the general boomerang shape such that the peak apex is spaced from the suction side wall and the indent apex is adjacent to the suction side wall, with the suction side wall cooling passages having the interior sides extending from the peak apex toward the suction side wall to the corner. The corner is a suction side corner, and the outer sides extend from the suction side corners with a component away the suction side to the indent apex.

In another embodiment according to any of the previous embodiments, at least some of the pressure side wall cooling passages and at least some of the suction side wall cooling passages having a film cooling hole extending from at least one of the pressure side into the pressure side wall cooling passages or from the suction side into the suction side wall cooling passages.

In another embodiment according to any of the previous embodiments, at least some of the film cooling hole on the pressure side extend from the pressure side wall into the pressure side wall cooling passages at the indent apex, and at least some of the film cooling holes on the suction side extend into the suction side wall cooling passages at the indent apex.

In another embodiment according to any of the previous embodiments, there are a plurality of the pressure side and suction side wall cooling passages having the generally boomerang shape.

In another embodiment according to any of the previous embodiments, at least some of the plurality of pressure wall cooling passages are connected to each other by a connecting passage, and at least some of the plurality of suction side wall cooling passages are connected to each other through connecting passages.

In another embodiment according to any of the previous embodiments, the film cooling holes associated with each of the wall cooling passages on the pressure side and the suction side have a first meter portion communicating to the pressure side wall cooling passages and the suction side wall cooling passages and an enlarged diffused portion connecting the first meter portion to an outer surface of the respective one of this pressure side and suction side.

In another embodiment according to any of the previous embodiments, a center height is defined between the indent apex and the peak apex, and an edge distance is defined between the interior side connecting the peak apex to the corner. The outer side connects the corner to the indent apex at fillet tangencies connecting the curved portion defining the corner to each of the side portions, and a ratio of the center height to the edge distance is greater than or equal to 1.1 and less than or equal to 2.5.

In another embodiment according to any of the previous embodiments, a width is defined between the corners of the wall cooling passages, a peak height is defined between the peak apex and a line connecting two points at each side of each of the wall cooling passages that are closest to the associated wall, and a ratio of the peak height to the width is greater than or equal to 0.3 and less than or equal to 1.0.

In another embodiment according to any of the previous embodiments, an indent height is defined between the line and the indent apex and a ratio of the indent height to the width is greater than or equal to 0.05 and less than or equal to 0.3.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
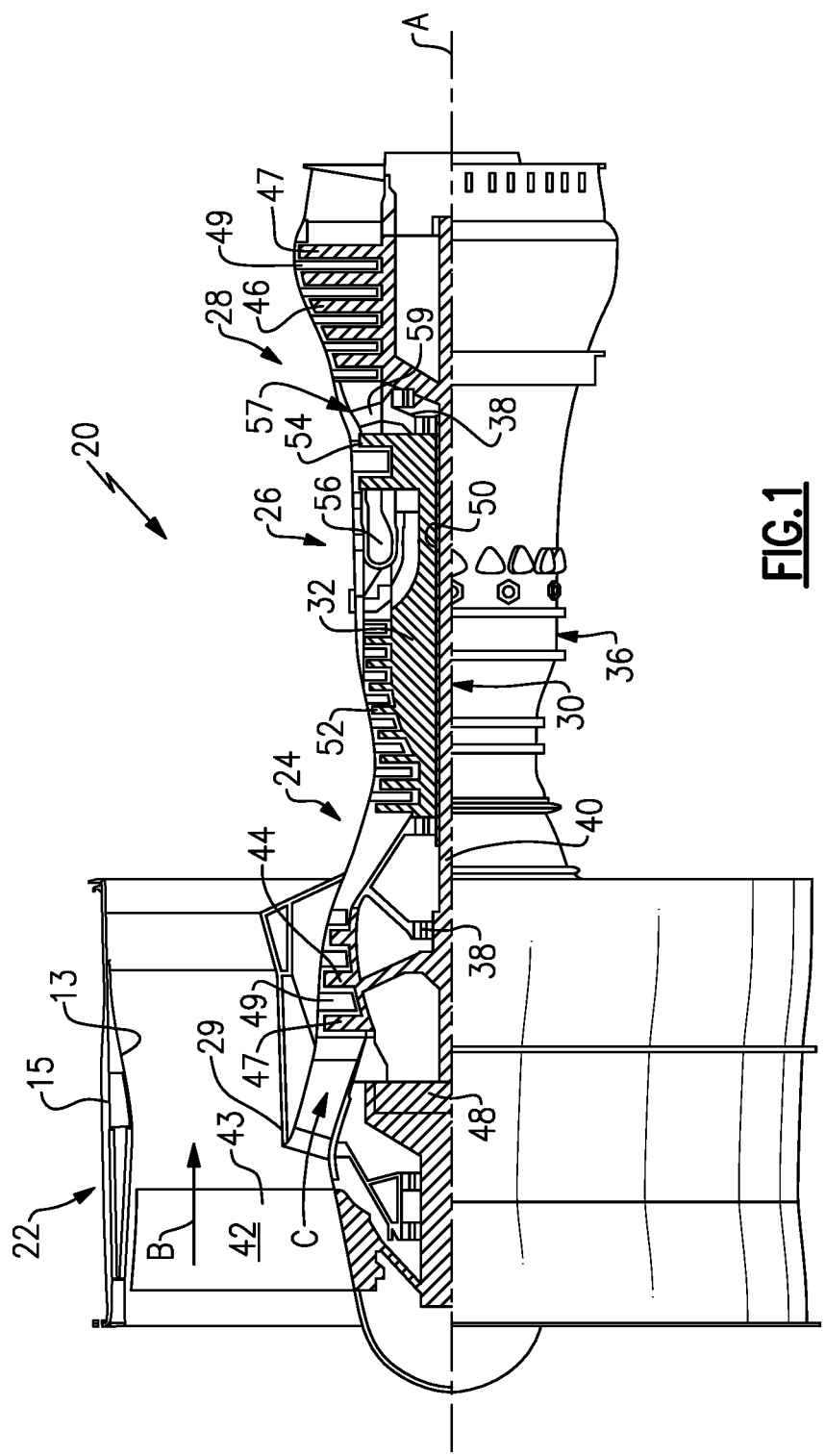
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } °R)/(518.7°R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
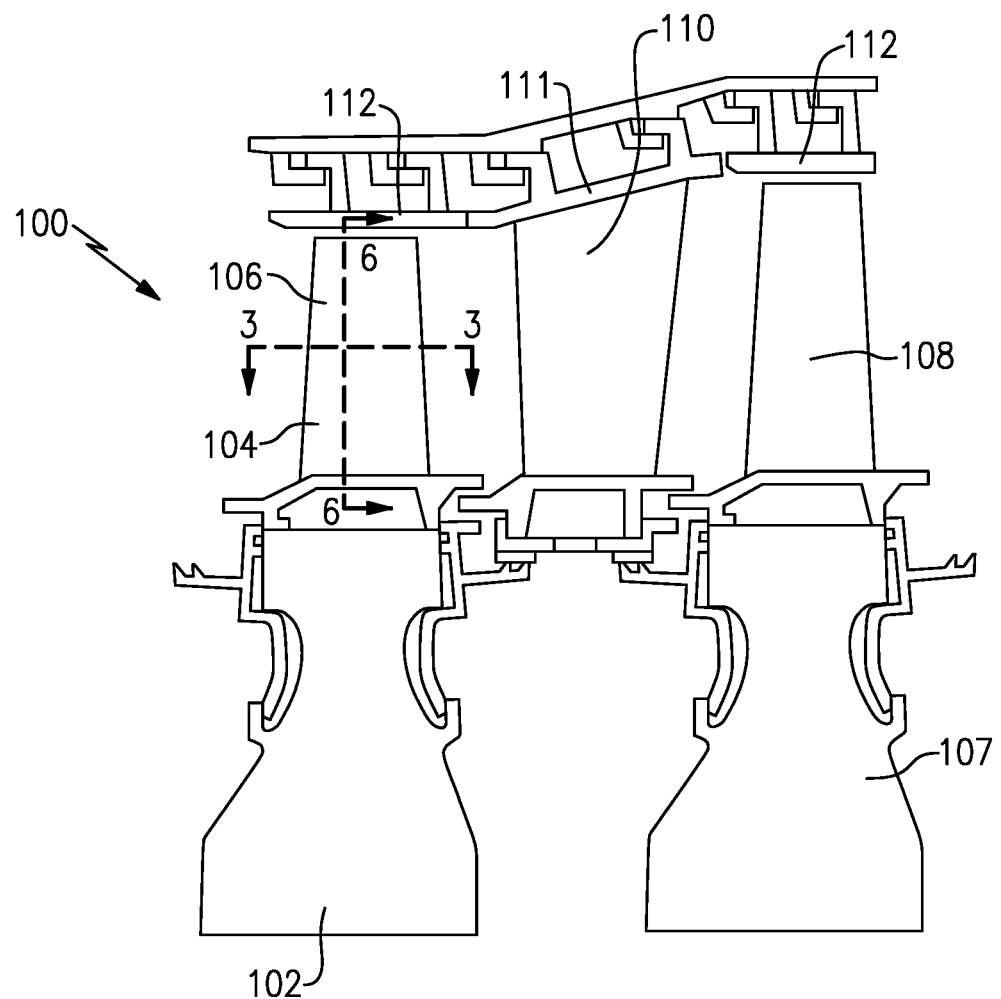
FIG. 2 schematically shows a turbine section for an engine such as the FIG. 1 engine.

FIG. 2 schematically shows a turbine section 100. Turbine section 100 includes a first stage turbine rotor 102 mounting a row of first stage turbine blades 104. As known, turbine blade 104 has an airfoil 106. A second stage turbine rotor 107 mounts a row of second stage turbine blades 108. A vane row 110 is positioned axially intermediate blades 104 and 108 and has an outer platform 111. Blade outer air seals 112 are shown radially outwardly of a radially outward tip of the blades 104 and 108.

Figure 3:
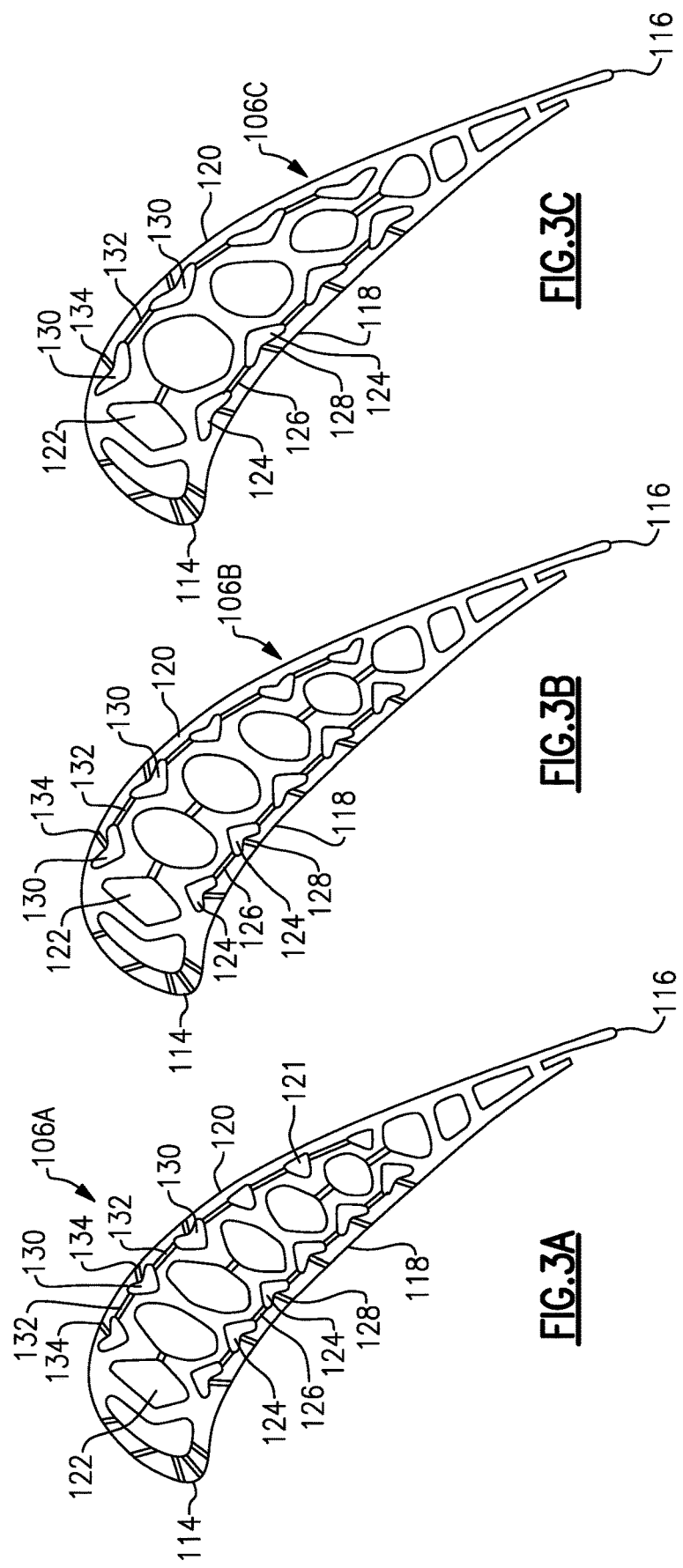
FIG. 3A shows a cross-section along line 3-3 of FIG. 2.
FIG. 3B shows a second embodiment cross-section along line 3-3 of FIG. 2.
FIG. 3C shows another embodiment cross-section along line 3-3 of FIG. 2.

FIG. 3A is a cross-sectional view along line 3-3 of FIG. 2 and shows a first embodiment 106A. Embodiment 106A has a leading edge 114, a trailing edge 116, a pressure side 118, and a suction side 120. There are main cooling passages 122 extending through a central portion of the airfoil 106A and spaced between the leading edge 114 and trailing edge 116. There are also pressure side wall cooling passages 124 between the central passages 122 and the pressure side 118. The pressure side wall cooling passages 124 are connected by connecting passages 126. Each of the wall cooling passages 124 also has film cooling holes 128 extending to the pressure side 118.

Note that there is overlap between the wall cooling passages 124 and the central passages 122 in a direction between the leading edge 114 and trailing edge 116. Other wall cooling passages 130 are associated with the suction side 120. These passages are connected by passages 132 and extend to film cooling holes 134.

There is also overlap in a direction between the leading edge 114 and the trailing edge 116 of the central cooling passages 124 and wall cooling passages 130 associated with the suction side 120.

FIG. 3B shows another embodiment 106B.

FIG. 3C shows yet another embodiment 106C. As shown between FIGS. 3A-3C, there can be any number of passages and positioning of the passages.

Figure 4:
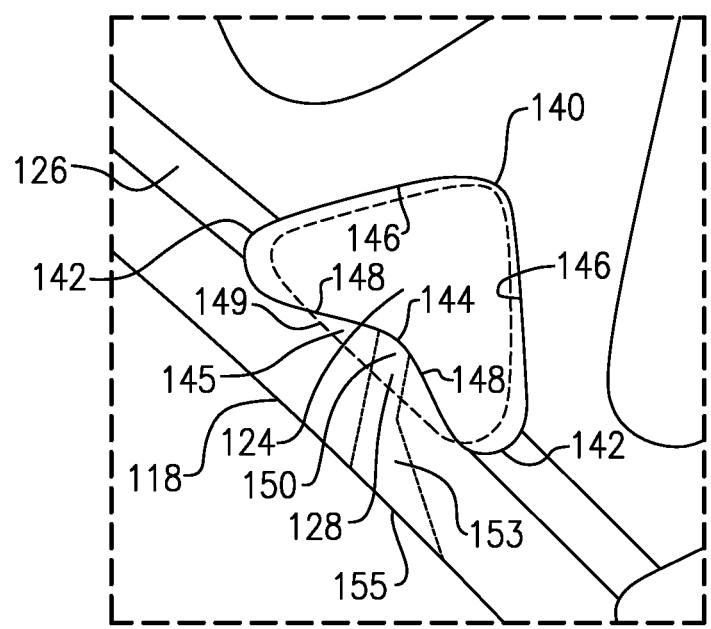
FIG. 4 shows a wall cooling passage on a pressure side.

As shown in FIG. 4, the pressure side cooling passage 124 is generally boomerang shaped. Briefly, this could be defined as having a first apex 140 spaced furthest away from the pressure side 118 and a second indent apex 144 spaced adjacent to the pressure side 118. In the prior art, the wall cooling passages were often triangular. The use of the boomerang shape provided by the indent apex 144 provides additional material 145 or a thicker wall in that location. This allows the film cooling hole 128 to extend more deeply into the area 145. Film cooling hole 128 has a meter portion 150 that connects into the wall cooling passage 122 and leads to an enlarged diffused portion 153 communicating with an outlet 155.

The shape of the wall cooling passage 124 extends from apex 140 with interior sides 146 extending away from each other to rounded corners 142 that extend into outer sides 148 which extend away from the pressure side 118 to the indent apex 144. The indent apex 144 and outer sides 148 may contain heat transfer features such as trip strips, pin fins, spherical bumps, spherical dimples, etc.

A triangular shape passage is shown in outline at 149. As can be appreciated, the triangular shape 149 is shown here with the same approximate cross-sectional area as the wall cooling passage 124. However, due to the increased material 145, one can see the interior sides 146 extend away from each other to create a larger angle at the apex 140 compared to the triangular shape 149. In addition, the corners 142 are shown to result in a greater width than that of the triangular shape passage 149. This allows for a larger fillet at apex 140 where concentrated stresses would be the highest. The larger fillet will lower the concentrated stress.

Returning to FIG. 3A, triangular wall cooling passages 121 may be use used at areas that do not need film cooling holes.

As shown in FIG. 4, nominally, film cooling hole 128 extends from the pressure side 118 into the wall cooling passages 124 at the indent apex 144. However, due to tolerances, film cooling hole 128 may wind up intersecting outer sides 148.

Figure 5:
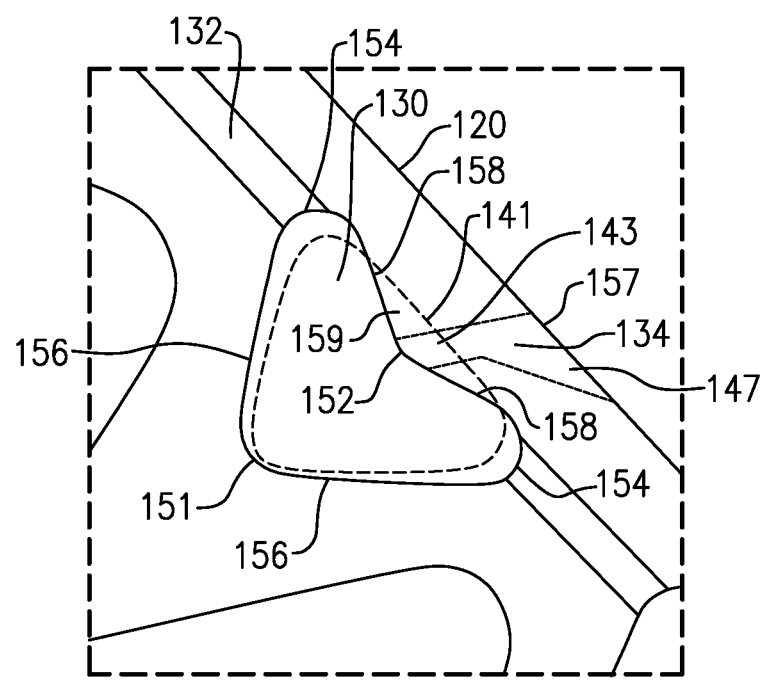
FIG. 5 shows a wall cooling passage on a suction side.

FIG. 5 shows a wall cooling passage 130 for the suction side 120. The shape has a first apex 151 spaced furthest away from suction side 120 and an indent apex 152 spaced adjacent suction side 120. Interior sides 156 extend away from the apex 151 with an angle that is seen to be greater than the angle of the triangular shape cooling passage 141 of the same cross-sectional area. Here again, additional material 159 is provided by the outer sides 158 extending from corners 154 to the indent apex 152. The additional material 159 allows the film cooling hole 134 to be relatively deep and to have the enlarged diffused portion as in the FIG. 4 embodiment. Film Cooling Hole 134 has a meter portion 143 communicating with wall cooling passage 130 and leads to an enlarged diffused portion 147 communicating with an outlet 157. The indent apex 152 and outer sides 158 may contain heat transfer features such as trip strips, pin fins, spherical bumps, spherical dimples, etc.

As shown in FIG. 5, nominally, the film cooling hole 134 associated with the suction side 120 extends into the wall cooling passage 130 at its indent apex 152. However, due to tolerances, film cooling hole 134 may wind up intersecting outer sides 158.

The shape allows a larger surface area adjacent to the hot walls, which will reduce hot wall metal temperatures. Moreover, due to the indent apex 152, the height of the cavity center is reduced, minimizing the adverse effect of Coriolis on the suction side 120. Due to Coriolis, the cooling flow wants to migrate away from the suction side 120. The larger the cavity height, the farther the cooling flow migrates away from the suction side surface of the cavity. By reducing the cavity height with the indentation, the flow becomes closer to the cavity suction side surface, thereby providing the higher heat transfer coefficient on the cavity suction side surface. This results in lower external metal temperatures and through wall gradients, which in turn lowers thermal stress.

The pressure side cooling passages 124 and said suction side cooling passages 130 have a general boomerang shape, such that a peak apex is spaced from a respective one of the pressure side wall and suction side wall and an indent apex is adjacent to a respective one of the pressure side wall and the suction side wall. The wall cooling passages 124 and 130 have interior sides extending from the peak apex toward the respective one of the pressure side and suction side to a corner. There are outer sides extending from the corners with a component away from the respective one of the suction side wall and the pressure side wall to the indent apex. A film cooling hole extends from the respective one of the pressure side wall and suction side wall, and into the wall cooling passage.

Figure 6:
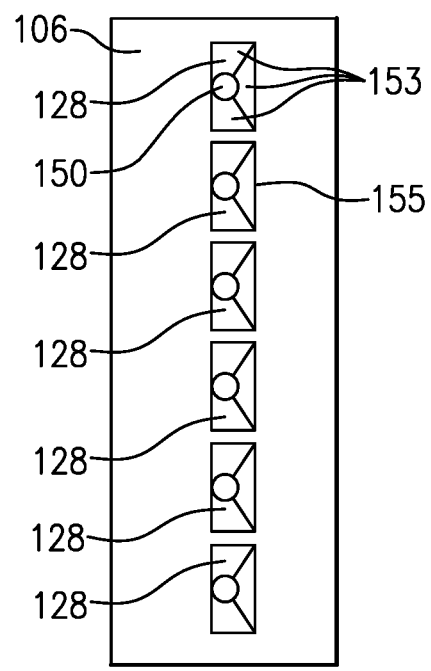
FIG. 6 is a view generally along line 6-6 of FIG. 2.

FIG. 6 is a view along line 6-6 of FIG. 2 and shows the film cooling holes 128. As shown, the external breakout can be relatively large due to the increased wall thickness through which they traverse. Of course, FIG. 6 shows only a portion of the pressure wall 118.

Figure 7:
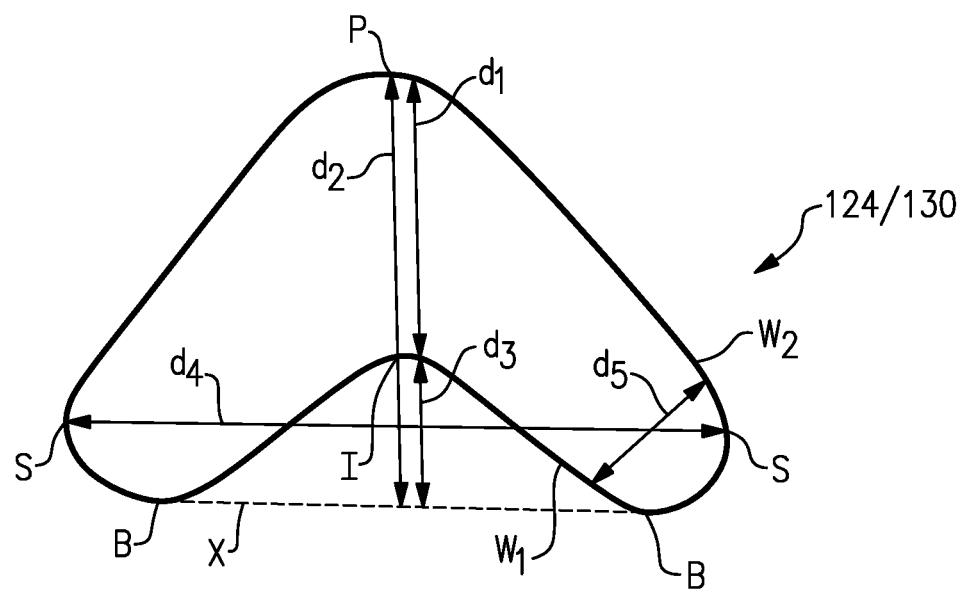
FIG. 7 shows geometric details of the wall cooling passages according to this disclosure.

FIG. 7 shows geometric details of wall cooling passages 124 and 130. The peak apex P and indent apex I are separated by a distance $d_1$. A line X is defined between the most remote base points B of each side of the boomerang shape. A distance $d_2$ is defined between X and the peak apex P.

An indent height $d_3$ is defined between line X and the indent apex I. A width $d_4$ is defined between corners S. An edge distance $d_5$ is defined between the walls $w_1$ and $w_2$ at fillet tangencies near the end of the passages 124-130.

In embodiments, a ratio of $d_1$ to $d_5$ is greater than or equal to 1.1 and less than or equal to 2.5. A ratio of $d_2$ to $d_4$ is greater than or equal to 0.3 and less than or equal to 1.0. A ratio of $d_3$ to $d_4$ is greater than or equal to 0.05 and less than or equal to 0.3. The size of the components here are greatly exaggerated to illustrate the features. As examples only, in embodiments, $d_3$ may be on the order of 0.005 inch to 0.025 inch.

A gas turbine engine under this disclosure could be said to include a compressor section, a combustor section, and a turbine section. The combustor section and the turbine section have components. At least one of the components has a body with a pair of spaced walls, with at least one of the walls for facing a fluid flow when mounted in a gas turbine engine. There are a plurality of wall cooling passages having a generally boomerang shape such that peak apex is spaced from the wall and an indent apex is adjacent to the wall, with the plurality of wall cooling passages having interior sides extending from the peak apex toward the wall to define a corner. Outer sides extend from the corners with a component away from the wall to the indent apex.

A component under this disclosure could be said to include an airfoil 106 extending from a leading edge 114 to a trailing edge 116. The walls include a pressure side wall 118 connecting the leading edge to the trailing edge and a suction side wall 120 also connecting the leading edge to the trailing edge as well as internal cooling passages in the airfoil between the leading edge, the suction side, the trailing edge, and the pressure side. The cooling passages include central cooling passages 122, pressure side wall cooling passages 124, and suction side wall cooling passages 130. At least one of the pressure side wall cooling passages has the general boomerang shape such that the peak apex 140 is spaced from the pressure side wall and the indent apex 144 is adjacent to the pressure side wall. The pressure side wall cooling passages have the interior sides 146 extending from the peak apex toward the pressure side wall to the corner and the corner is a pressure side corner 142. The outer sides 148 extending from the pressure side corners with a component away from the pressure side wall to the indent apex 144. At least one of the suction side cooling passages 130 has the general boomerang shape such that the peak apex 151 is spaced from the suction side wall and the indent apex 152 is adjacent to the suction side wall. The suction side wall cooling passages have the interior sides 156 extending from the peak apex toward the suction side wall to the corner and the corner is a suction side corner 154. The outer sides 158 extending from the suction side corners with a component away the suction side to the indent apex 152.

A center height is defined between the indent apex and the peak apex. An edge distance is defined between the wall connecting the peak apex and the indent apex to the corner, and the wall connecting the corner to the indent apex at fillet tangencies connecting the curved portion defining the corner to each of the wall portions. A ratio of the center height to the edge distance is greater than or equal to 1.1 and less than or equal to 2.5.

A width is defined between the corners of the at least one of the wall cooling passages associated with each of the pressure side and suction side. A peak height is defined between the peak apex and a line connecting two points at each side of each of the wall cooling passages associated with the pressure side and the suction side that are closest to the associated wall. A ratio of the peak height to the width is greater than or equal to 0.3 and less than or equal to 1.0.

Although embodiments of this disclosure have been shown, a worker of ordinary skill in this art would recognize that modifications would come within the scope of this disclosure. For instance, although the invention was described and shown using a blade, the invention may also be used in other engine components such as a vane, BOAS, or combustor panel. For that reason, the following claims should be studied to determine the true scope and content of this disclosure.

What is claimed is:

1. A turbine component comprising:
a body having a pair of spaced walls, with at least one of the walls for facing a fluid flow when mounted in a gas turbine engine, there being a plurality of wall cooling passages having a boomerang shape such that a peak apex is spaced from the wall and an indent apex is adjacent to the wall, with the plurality of wall cooling passages having interior sides extending from the peak apex toward the wall to define a corner, and outer sides extending from the corners with a component away from the wall and to the indent apex; and
wherein a center height is defined between the indent apex and the peak apex, and an edge distance is defined between the interior side connecting the peak apex to the corner, and the outer side connecting the corner to the indent apex at fillet tangencies connecting the curved portion defining the corner to each of the side portions, and a ratio of the center height to the edge distance is greater than or equal to 1.1 and less than or equal to 2.5.

2. The component as set forth in claim 1, wherein the component has an airfoil extending from a leading edge to a trailing edge and the walls including a pressure side wall connecting the leading edge to the trailing edge and a suction side wall also connecting the leading edge to the trailing edge;
internal cooling passages in the airfoil between the leading edge, the suction side, the trailing edge, and the pressure side, the cooling passages include central cooling passages, and the wall cooling passages including pressure side wall cooling passages, and suction side wall cooling passages;
at least one of said pressure side wall cooling passages having the boomerang shape such that the peak apex is spaced from the pressure side wall and the indent apex adjacent to the pressure side wall, with the pressure side wall cooling passages having the interior sides extending from the peak apex toward the pressure side wall to the corner and the corner being a pressure side corner, and the outer sides extending from the pressure side corners with a component away from the pressure side wall to the indent apex; and
at least one of said suction side cooling passages having the boomerang shape such that the peak apex is spaced from the suction side wall and the indent apex is adjacent to the suction side wall, with the suction side wall cooling passages having the interior sides extending from the peak apex toward the suction side wall to the corner and the corner being a suction side corner, and the outer sides extending from the suction side corners with a component away the suction side to the indent apex.

3. The turbine component as set forth in claim 2, wherein at least some of the pressure side wall cooling passages and at least one of the suction side wall cooling passages having a film cooling hole extending from at least one of the pressure side into the pressure side wall cooling passages or from the suction side into the suction side wall cooling passages.

4. The turbine component as set forth in claim 3, wherein at least some of the film cooling hole on the pressure side extend from the pressure side wall into the pressure side wall cooling passages at the indent apex, and at least some of the film cooling holes on the suction side extend into the suction side wall cooling passages at the indent apex.

5. The turbine component as set forth in claim 3, wherein there are a plurality of said pressure side and suction side wall cooling passages having the boomerang shape.

6. The turbine component as set forth in claim 3, wherein at least some of the plurality of pressure wall cooling passages are connected to each other by a connecting passage, and at least some of the plurality of suction side wall cooling passages are connected to each other through connecting passages.

7. The turbine component as set forth in claim 3, wherein the film cooling holes associated with each of the wall cooling passages on the pressure side and the suction side have a first meter portion communicating to the pressure side wall cooling passages and said suction side wall cooling passages and an enlarged diffused portion connecting the first meter portion to an outer surface of the respective one of this pressure side and suction side.

8. The turbine component as set forth in claim 1, wherein a width is defined between the corners of the at least one of the wall cooling passages, a peak height is defined between the peak apex and a line connecting two points at each side of each of the wall cooling passages that are closest to the associated wall, and a ratio of the peak height to the width is greater than or equal to 0.3 and less than or equal to 1.0.

9. The turbine component as set forth in claim 8, wherein an indent height is defined between the line and the indent apex and a ratio of the indent height to the width is greater than or equal to 0.05 and less than or equal to 0.3.

10. A gas turbine engine comprising:
a compressor section, a combustor section, and a turbine section, the combustor section and the turbine section having components, and at least one of the components having a body having a pair of spaced walls, with at least one of the walls for facing a fluid flow when mounted in a gas turbine engine, there being a plurality of wall cooling passages having a boomerang shape such that a peak apex is spaced from the wall and an indent apex is adjacent to the wall, with the plurality of wall cooling passages having interior sides extending from the peak apex toward the wall to define a corner, and outer sides extending from the corners with a component away from the wall and to the indent apex; and
wherein a center height is defined between the indent apex and the peak apex, and an edge distance is defined between the interior side connecting the peak apex to the corner, and the outer side connecting the corner to the indent apex at fillet tangencies connecting the curved portion defining the corner to each of the side portions, and a ratio of the center height to the edge distance is greater than or equal to 1.1 and less than or equal to 2.5.

11. The gas turbine engine as set forth in claim 10, wherein the component has an airfoil extending from a leading edge to a trailing edge and the wall including a pressure side wall connecting the leading edge to the trailing edge and a suction side wall also connecting the leading edge to the trailing edge;
  internal cooling passages in the airfoil between the leading edge, the suction side, the trailing edge, and the pressure side, the cooling passages include central cooling passages, and the wall cooling passages including pressure side wall cooling passages, and suction side wall cooling passages;
  at least one of said pressure side wall cooling passages having the boomerang shape such that the peak apex is spaced from the pressure side wall and the indent apex is adjacent to the pressure side wall, with the pressure side wall cooling passages having the interior sides extending from the peak apex toward the pressure side wall to the corner, the corner being a pressure side corner, and the outer sides extending from the pressure side corners with a component away from the pressure side wall to the indent apex; and
  at least one of said suction side cooling passages having the boomerang shape such that the peak apex is spaced from the suction side wall and the indent apex is adjacent to the suction side wall, with the suction side wall cooling passages having the interior sides extending from the peak apex toward the suction side wall to the corner, and the corner being a suction side corner, and the outer sides extending from the suction side corners with a component away the suction side to the indent apex.

12. The gas turbine engine as set forth in claim 11, wherein at least some of the pressure side wall cooling passages and at least some of the suction side wall cooling passages having a film cooling hole extending from at least one of the pressure side into the pressure side wall cooling passages or from the suction side into the suction side wall cooling passages.

13. The gas turbine engine as set forth in claim 12, wherein at least some of the film cooling hole on the pressure side extend from the pressure side wall into the pressure side wall cooling passages at the indent apex, and at least some of the film cooling holes on the suction side extend into the suction side wall cooling passages at the indent apex.

14. The gas turbine engine as set forth in claim 12, wherein there are a plurality of said pressure side and suction side wall cooling passages having the boomerang shape.

15. The gas turbine engine as set forth in claim 12, wherein at least some of the plurality of pressure wall cooling passages are connected to each other by a connecting passage, and at least some of the plurality of suction side wall cooling passages are connected to each other through connecting passages.

16. The gas turbine engine as set forth in claim 12, wherein the film cooling holes associated with each of the wall cooling passages on the pressure side and the suction side have a first meter portion communicating to the pressure side wall cooling passages and said suction side wall cooling passages and an enlarged diffused portion connecting the first meter portion to an outer surface of the respective one of this pressure side and suction side.

17. The gas turbine engine as set forth in claim 10, wherein a width is defined between the corners of the wall cooling passages, a peak height is defined between the peak apex and a line connecting two points at each side of each of the wall cooling passages that are closest to the associated wall, and a ratio of the peak height to the width is greater than or equal to 0.3 and less than or equal to 1.0.

18. The gas turbine engine as set forth in claim 17, wherein an indent height is defined between the line and the indent apex and a ratio of the indent height to the width is greater than or equal to 0.05 and less than or equal to 0.3.

* * * * *